United States Patent
Mitsch et al.

[15] 3,700,737
[45] Oct. 24, 1972

[54] PERFLUOROALKYL VINYL SULFONES

[72] Inventors: Ronald A. Mitsch; Robert J. Koshar, both of St. Paul, Minn.

[73] Assignee: Minnesota Mining and Manufacturing Company, St. Paul, Minn.

[22] Filed: Dec. 14, 1970

[21] Appl. No.: 98,096

Related U.S. Application Data

[62] Division of Ser. No. 732,865, May 29, 1968, Pat. No. 3,578,717.

[52] U.S. Cl. ................................................260/607 A
[51] Int. Cl. ..............................................C07c 147/02
[58] Field of Search..................260/607 A, 7.93 MU

[56] References Cited

UNITED STATES PATENTS

| | | |
|---|---|---|
| 2,472,672 | 1949 | Mighton................260/78.5 B |
| 2,478,378 | 1949 | Dickey..................260/78.5 B |
| 3,578,717 | 5/1971 | Mitsch et al...........260/607 A |

*Primary Examiner*—Lewis Gotts
*Assistant Examiner*—D. R. Phillips
*Attorney*—Kinney, Alexander, Sell, Steldt & Delahunt

[57] ABSTRACT

Perfluoroalkyl vinyl sulfones, $CF_3SO_2CH=CH_2$ and higher, are provided which are homopolymerized to oligomers in the presence of tertiary amine basic catalysts.

1 Claim, No Drawings

PERFLUOROALKYL VINYL SULFONES

This is a division of application Ser. No. 732,865 filed May 29, 1968 now U.S. Pat. No. 3,578,717.

This invention relates to a class of polymerizable monomers of the general formula $$R_fSO_2a\text{—}CH\text{=}CH_2$$

in which $R_f$ is a perfluoroalkyl group of one to 18 carbon atoms in a straight or branched chair although it may also be perfluorocyclohexyl. Thus it may be $CF_3$, $C_2F_5$, $C_4F_9$, $(CF_3)_2CF$, $C_8F_{17}$, $C_{16}F_{33}$, etc. These vinyl sulfones present an interesting and unusual degree of reactivity inasmuch as they are not only polymerizable but also add certain active hydrogen containing materials rather readily, e.g., primary and secondary amines, ammonia, and, in the presence of a basic catalyst, also primary and secondary alcohols, water and mercaptans. This reactivity and ready oxidizability of the vinyl groups may have prevented their preparation from the corresponding sulfides which are described in part in Harris, U.S. Pat. No. 3,048,569 although there is no suggestion that the vinyl sulfides can be converted to sulfones. Subsequent to the present invention, Knunyants and his coworkers in Zhurnal Obshchei Khimii vol. 37, p. 1,277–81 (June 1967) prepared trifluoromethyl vinyl sulfone and sulfoxide by dehydrohalogenation of the corresponding beta-chloroethyl compounds using triethylamine in ether. Other unsaturated sulfones have been made by condensation of aromatic aldehydes with alkyl trihalomethyl sulfones (Yagupol'skii and Panteleimonov, Zhurnal Obshchei Khimii vol. 36, p. 416–421 Mar. 1966) and from aromatic aldehydes and metal derivatives such as a Grignard reagent of methyl trifluoromethyl sulfone. (Yagupol'skii et al., vol. 34, p. 3,456–61 (1964).)

In accordance with the objects of this invention it has been found that beta-perfluoroalkanesulfonyl ethanols are readily dehydrated to provide vinyl perfluoroalkyl sulfones of the above general formula. Dehydration is conveniently effected by heating the alcohol and a dehydrating agent, e.g., $P_2O_5$, at 100° to 200°° C. in vacuo or in an inert atmosphere. Solid alcohols are generally readily dehydrated by reaction with $P_2O_5$ in solution in an inert solvent such as methylene chloride at temperatures up to the boiling point of the solvent followed by further heating at 100° or higher.

The vinyl perfluoroalkyl sulfones of the invention are useful for their ability to react with the active hydrogens of alcohols, mercaptans and primary and secondary amines giving respectively ethers, sulfides and secondary or tertiary amines and to homopolymerize by bulk or solution methods in the presence of tertiary amines as basic catalysts.

The method of producing representative vinyl perfluoroalkyl sulfones and of using them is more fully explained by the following examples.

Preparation of 2-(Perfluoromethanesulfonyl)ethanol

A 250 ml. three-necked flask fitted with stirrer, dropping funnel and condenser (drying tube) is charged with 9.14 g. (0.0615 mole) of perfluoromethyl methyl sulfone in 100 ml. of anhydrous diethyl ether at 10° C. and to this solution 32 ml. of methylmagnesium bromide (0.09 mole) in diethyl ether is added dropwise. After the addition is complete the reaction mixture is stirred for ½ hour at room temperature to complete liberation of methane.

Formaldehyde is produced by heating (180°–200° C.) 4.5 g. (0.15 mole) of dry paraformaldehyde in a 25-ml. two-necked pear shaped flask and is passed over the sulfone-Grignard mixture using a slow carrier stream of dry nitrogen. After the addition is complete, the reaction mixture is stirred for 1½ hours at room temperature and then hydrolyzed with 100 ml. of 3 N hydrochloric acid. After separating the ether layer, the aqueous solution is extracted twice with 100 ml. portions of diethyl ether and the ether extracts are combined and dried over magnesium sulfate. Evaporation of ether leaves a residue of 11.4 g. which is distilled at 78° C/4 mm. to provide pure $CF_3SO_2CH_2CH_2OH$, $n_D^{25}$ = 1.3970 in 66.5 percent yield.

Analysis:

Calculated for $C_3F_3H_5O_3S$: C, 20.2%; F, 32.0%; H, 2.8%;

Found: C, 20.2%; F, 32.0%; H, 2.7%.

Higher members of this series in which the perfluoroalkyl group includes several carbon atoms are best converted to the magnesium compound in pure tetrahydrofuran as described in the following preparation.

Preparation of 2-(Perfluorooctanesulfonyl)ethanol

A 500 ml. 3-necked flask fitted as above is charged with 20.0 g. (0.04 mole) of perfluorooctyl methyl sulfone and 300 ml. of tetrahydrofuran (distilled from lithium aluminum hydride). The sulfone-tetrahydrofuran mixture is cooled to about −5° C. with an ice salt bath and a total of 16 ml. of 3.48 molar methylmagnesium bromide (0.05 mole) in ether is added dropwise. Methane gas is liberated and after about 1 hour, 3.61 g. (0.121 mole) of formaldehyde vapor is added as above described. After the addition is complete, the reaction mixture is stirred for 2 hours and hydrolyzed with dilute HCl.

Perfluorooctanesulfonyl ethanol is recovered by substantially the above procedure as a solid which is recrystallized from benzene and melts at 136° to 140° C.

Analysis:

Calculated for $C_{10}F_{17}H_5O_3S$: C, 22.7%; F, 61.2%; H, 1.0%;

Found: C, 23.5%; F, 60.3%; H, 1.1%.

Preparation of Perfluoromethyl Vinyl Sulfone

A 1 inch diameter tube about 4 inches long, sealed at the lower end and fitted with a 24/40 standard tapered joint at the top is filled to a depth of about 2 inches with dry $P_2O_5$ followed by the addition of 1 g. (0.05 mole) of $CF_3SO_2CH_2CH_2OH$ prepared above. A joint and stopcock is attached to the tube and the tube heated at 150° C. during a period of 22 hours while the reaction mixture and its contents are maintained under full vacuum so that the volatile products pass through a −196° C. trap. The −196° trap is then warmed to room temperature to yield a residue of liquid with a vapor pressure of about 25 mm. at room temperature. The material is quite pure perfluoromethyl vinyl sulfone. The crude product is analyzed without further purification.

Analysis:

Calculated for $C_3F_3H_3O_2S$: C, 22.5%; F, 35.6%; H, 1.9%;

Found: C, 22.7%; F, 36.0%; H, 1.0%.

On a larger scale, 21 g. (0.12 mole) of 2-(perfluoromethylsulfonyl)ethanol is added slowly to 48.5 g.

(0.34 mole) of phosphorus pentoxide in a 250 ml. flask. The mixture is heated at 160°–190° C. under vacuum (< 1 mm.) over a period of 10 hours and the volatile product (16.4 g.) collected in a trap cooled with liquid nitrogen. Distillation yields 15.6 g. (82 percent yield) of perfluoromethyl vinyl sulfone, b.p. 75°–76° C. (110 mm.) identical with the above material.

Preparation of Perfluorooctyl Vinyl Sulfone

A mixture of 2.0 g. (0.004 mole) of 2-(perfluorooctanesulfonyl)ethonol, 10 g. of phosphorus pentoxide and 25 ml. of dry methylene chloride is stirred in a flask at room temperature for 0.5 hour and the major portion of the methylene chloride is then removed under reduced pressure. The flask containing the solid residue is connected to a sublimator and heated up to 200° in vacuo. About 0.9 g. of a white solid, m.p. 70°–91 C., is obtained. This solid is extracted with reagent grade acetone and the acetone soluble portion resublimed in vacuo to yield perfluorooctyl vinyl sulfone, m.p. 86°–89° C.

Analysis:

Calculated for $C_{10}F_{17}H_3O_2S$: C, 23.5%; F, 63.3%; H, 0.6%;

Found: C, 22.6% F, 64.2%; H, 0.6%.

Nucleophilic addition reactions, which proceed most readily for vinyl perfluoromethyl sulfone, are illustrated by the following reactions.

A. Reaction with Diethylamine

A mixture of 1.4 g. (0.02 mole) of diethylamine, 2.33 g. (0.015 mole) of vinyl perfluoromethyl sulfone and 5 ml. of diethyl ether is stirred at room temperature for 38 hours. Distillation yields 2.3 g. of $CF_3SO_2CH_2CH_2N(C_2H_5)_2$, b.p. 102–103 °C. (35 mm.). N.m.r. absorptions ($\tau$) occur at 8.95 ($CH_3$; triplet), 7.43 ($CH_3CH_2$; quadruplet) and at 6.64 and 6.89 for the methylenes of the $-SO_2CH_2CH_2N<$ group.

Analysis:

Calculated for $C_7F_3H_{14}NO_2S$: C, 36.0%; F, 24.5%; H, 6.0%; N, 6.0%;

Found: C, 35.8%; F, 24.7%; H, 5.8%; N, 5.8%.

By an analogous reaction, $C_8F_{17}SO_2CH_2CH_2N(C_2H_5)_2$ is obtained as a waxy solid melting about 45° to 51° C. from perfluorooctyl vinyl sulfone.

B. Reaction with Methanol 3 grams (0.02 mole) of vinyl perfluoromethyl sulfone is added to a stirred solution of 1.2 g. (0.04 mole) of anhydrous methanol and 0.001 mole of sodium methoxide and the mixture heated under reflux for 1 hour, cooled to room temperature and then neutralized with glacial acetic acid. From the residue is obtained 1.2 g. of $CF_3SO_2CH_2CH_2OCH_3$, b.p. 112°–114° C. (80 mm.). The proton n.m.r. spectrum exhibits a strong singlet at 6.59$\tau$ assigned to the $CH_3O$ group, and absorptions at 6.08$\tau$ and 6.49$\tau$ assigned to the methylenes of the $-CH_2CH_2O-$ group.

C. Reaction with n-Butanol

A mixture of 2.7 g. (0.017 mole) of vinyl perfluoromethyl sulfone, 1.8 g. (0.024 mole) of n-butanol and 0.04 g. of 40 percent benzyltrimethylammonium hydroxide (in methanol) is stirred at room temperature for 20 hours, neutralized with glacial acetic acid and distilled. $CF_3SO_2CH_2CH_2OC_4H_9$, is obtained, b.p. 90° C. (5 mm.).

Polymerization to new and useful polymers is described below. It is contemplated that basic catalysts such as trialkylamines, tertiary dialkarylamines and heterocyclic amines will be used at temperatures from about 15° C. up to about 150° C. in inert anhydrous solvents and in amounts from about 0.1 to 5 or 10 percent of the weight of monomeric vinyl sulfone. The novel polymers appear to be predominantly oily, greasy or waxy oligomers, including about 2 to 5 monomer units, with molecular weights of a few hundred to 1,000 or more. The oligomers can be applied to textiles and cured thereon.

Bulk Polymerization

A dry borosilicate glass tube is charged under nitrogen with 0.90 g. (5.6 mM.) of vinyl perfluoromethyl sulfone followed by 0.017 g. (0.15 mM.) of 1,4-diazabicyclo [2.2.2] octane. An exothermic reaction occurs and the solution becomes viscous. The tube is closed and heated at 75°–90° C. for 4 hours and then in vacuo at 60°–65° C. for 2 hours yielding 0.81 g. of a viscous liquid product essentially free from the starting vinyl sulfone. The product is dissolved in 25 ml. of methylene chloride and the solution shaken with an equal volume of 5 percent aqueous hydrochloric acid. The methylene chloride is evaporated and the residue heated at 50°–60° C. in vacuo for 4 hours yielding 0.60 g. of viscous liquid poly(vinyl perfluoromethyl sulfone) having number average molecular weight (acetone as solvent) of 380.

Solution Polymerization

A dry borosilicate glass ampoule containing 2.00 g. (12.5 mM.) of vinyl perfluoromethyl sulfone, 0.014 g. (0.12 mM.) of 1,4-diazabicyclo [2.2.2] octane and 10 ml. of methylene chloride is sealed under vacuum and shaken at 95° C. for 15 hours. The ampoule is opened and the methylene chloride removed under reduced pressure. The residue is heated at 60°–75° C. in vacuo for 1 hour yielding 1.7 g. of a syrupy liquid which is essentially poly(vinyl perfluoromethyl sulfone) with number average molecular weight of 390.

Poly(vinyl perfluoromethyl sulfone) prepared as described above is used to treat a 3.5 × 5 cm. sample of 80 × 80 unbleached and undyed 100 percent cotton fabric by soaking the latter in 2 ml. of a 30 percent by weight solution of the polymer in methylene chloride for 1 minute. The fabric is air-dried and heated at 130° C. for 15 minutes. The weight gain of the equilibrated fabric over the untreated sample is 9.2 percent. Distilled water applied to the fabric forms droplets which are not absorbed even after 25 minutes contact. In contrast, untreated fabric or fabric treated and air-dried without heating wet immediately. The fabric is also found to be significantly resistant to soiling when shaken with synthetic soil for 1 minute and compared with a sample of untreated cotton tested in the same manner.

A piece of fabric treated as above is immersed and agitated in carbon tetrachloride for 25 minutes, air-dried and then heated at 130° C. for 15 minutes. The equilibrated fabric contains 1.3 percent by weight of fluorinated polymer and is still repellent toward water although to a lesser degree than the originally treated and cured sample.

Polymerization may be carried out and fabric treated without intermediate separation of polymer. A 3.5 × 5 cm. sample of 80 × 80 unbleached and undyed 100 percent cotton fabric is soaked in 1.0 ml. of a dry acetone solution containing 5.8 percent weight of vinyl perfluorooctyl sulfone and 0.1 percent by weight of 1,4-diazabicyclo [2.2.2] octane previously heated to 55° C. for 5 minutes. The fabric is air-dried and heated at 130° C. for 10 minutes. The treated fabric gains 0.2 percent in weight over untreated fabric. It has an oil rating of no. 4 according to Oil Repellency Test Method 118-1966T described in "Technical Manual of the American Association of Textile Chemists and Colorists."

What is claimed is:

1. An oligomer of perfluoroalkyl vinyl sulfone comprising recurring units

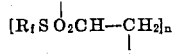

wherein $R_f$ is perfluoroalkyl of one to 18 carbon atoms and $n$ is a number integer from 2 to 5.

UNITED STATES PATENT OFFICE
CERTIFICATE OF CORRECTION

Patent No. 3,700,737     Dated October 24, 1972

Inventor(s) Ronald A. Mitsch and Robert J. Koshar

It is certified that error appears in the above-identified patent and that said Letters Patent are hereby corrected as shown below:

Column 1, line 6, the formula

"$R_fSO_2a- CH=CH_2$" should read --$R_fSO_2- CH=CH_2$-- line 9 "chair" should read --chain--.

Column 3, line 33, the formula

"$CP_3SO_2CH_2$" should read --$CF_3SO_2CH_2$--.

The formula in Claim 1 should read as follows:

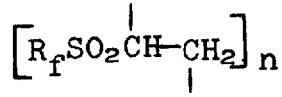

Signed and sealed this 15th day of May 1973.

(SEAL)
Attest:

EDWARD M. FLETCHER, JR.
Attesting Officer

ROBERT GOTTSCHALK
Commissioner of Patents